United States Patent [19]

Lehto

[11] Patent Number: 5,066,325
[45] Date of Patent: Nov. 19, 1991

[54] COGENERATION PROCESS FOR PRODUCTION OF ENERGY AND IRON MATERIALS, INCLUDING STEEL

[75] Inventor: John M. Lehto, Cokato, Minn.

[73] Assignee: Northern States Power Company, Minneapolis, Minn.

[21] Appl. No.: 314,988

[22] Filed: Feb. 24, 1989

Related U.S. Application Data

[63] Continuation-in-part of Ser. No. 234,914, Aug. 22, 1988, which is a continuation-in-part of Ser. No. 153,242, Feb. 8, 1988, which is a continuation-in-part of Ser. No. 91,427, Aug. 31, 1987, abandoned.

[51] Int. Cl.⁵ .......................................... C21B 11/02
[52] U.S. Cl. ........................................ 75/499; 75/958; 208/426; 208/427
[58] Field of Search ........................ 75/40, 499, 958; 208/427, 426

[56]  References Cited

U.S. PATENT DOCUMENTS

| | | | |
|---|---|---|---|
| 2,034,071 | 3/1936 | Wickland | 266/24 |
| 3,479,021 | 11/1969 | Escher | 144/66 |
| 3,617,042 | 11/1971 | Nakagawa . | |
| 3,669,318 | 6/1972 | Goksel . | |
| 3,770,416 | 11/1973 | Goksel . | |
| 3,801,305 | 4/1974 | Nilles et al. | 75/530 |
| 3,895,088 | 7/1975 | Goksel . | |
| 3,918,598 | 11/1975 | Heitmann | 414/786 |
| 4,008,054 | 2/1977 | Clancey et al. | 208/427 |
| 4,025,059 | 5/1977 | Steinmetz et al. | 266/215 |
| 4,057,231 | 11/1977 | Chaze | 266/239 |

(List continued on next page.)

FOREIGN PATENT DOCUMENTS

| | | |
|---|---|---|
| 44669 | 1/1982 | European Pat. Off. ................ 75/3 |
| 139310 | 5/1985 | European Pat. Off. . |
| 1583974 | 9/1970 | Fed. Rep. of Germany . |
| 3345107 | 9/1984 | Fed. Rep. of Germany . |
| 3345107 | 9/1986 | Fed. Rep. of Germany . |
| 3510787 | 9/1986 | Fed. Rep. of Germany ......... 75/29 |
| 3523487 | 1/1987 | Fed. Rep. of Germany . |
| 2003496 | 3/1977 | United Kingdom . |

OTHER PUBLICATIONS

Pellet Technology Corporation "Technology Overview," Mar. 1986.

(List continued on next page.)

Primary Examiner—Melvyn J. Andrews
Attorney, Agent, or Firm—Merchant, Gould, Smith, Edell, Welter & Schmidt

[57]  ABSTRACT

A process and arrangement are provided for the efficient generation of energy from coal, while at the same time providing for a relatively inexpensive step in processing of iron or steel, and the extraction of valuable materials such as oils from coal. An advantage to the process is that relatively low quality coals can be utilized, since the coal is pretreated before any burning operation. Generally, the process involves three interacting stages. In the First Stage, a coal liquefaction/pyrolysis procedure is utilized to drive off volatiles, and form a very low volatile char. The volatiles can be collected and utilized as a valuable oil product, such as for diesel fuel or the like. The char material is preferably pelletized and utilized as a reductant, in a Second Stage of iron reduction and melting. Preferably the iron reduction and melting operation is conducted in a pressurized cupola and the high pressure hot product gases are utilized directly and/or indirectly, to generate electricity in Stage Three, and to produce hot steam for use in driving certain portions of Stages One and Two. High pressure product gases have a greater energy content than gases at atmospheric pressure and facilitate more efficient production of electricity in Stage Three. Problems of handling molten iron from a pressurized cupola are solved using the pressure to drive the molten iron up a vertical tap mechanism. The weight of the metal offsets the pressure as the metal rises so that the metal is driven up to a point at which the metal's pressure is decreased to atmospheric pressure. Also, preferably steel is formed from the reduced iron product of Stage Two. Also, preferably slag formed during the process is converted to a fiber product.

20 Claims, 8 Drawing Sheets

U.S. PATENT DOCUMENTS

| | | | |
|---|---|---|---|
| 4,164,469 | 8/1979 | Wagner | 75/29 |
| 4,219,519 | 8/1980 | Goksel . | |
| 4,239,530 | 12/1980 | Goksel . | |
| 4,309,024 | 1/1982 | Lillybeck | 266/900 |
| 4,334,920 | 6/1982 | Mori et al. | 74/26 |
| 4,495,054 | 1/1985 | Claflin | 75/29 |
| 4,504,043 | 3/1985 | Yamaoka et al. | 266/160 |
| 4,511,372 | 4/1985 | Axelsson | 48/197 R |
| 4,526,597 | 7/1985 | Olinger et al. . | |
| 4,528,029 | 7/1985 | Goksel . | |
| 4,594,140 | 6/1986 | Cheng | 208/428 |
| 4,601,742 | 7/1986 | Kaveh . | |
| 4,650,510 | 3/1987 | Tuovinen . | |
| 4,753,677 | 6/1988 | Rachner | 266/900 |
| 4,874,427 | 10/1989 | Hamada et al. | 75/483 |

OTHER PUBLICATIONS

K. W. Lange, "Thermodynamics and Kinetics at High Temperature in Ladle Metallurgy," *Proceedings of the Second International Conference on Iron & Steel Technology and New Materials,* Oct. 7-9, 1986, Pohang, Republic of Korea, p. 43, Tables 5-7 at pp. 76-77.

Klara et al., *Paper Presented at Alternate Energy '89,* "Mild Gasification: A New Goal" (published Apr. 1989).

O. E. Manz, *Cement and Concrete Research,* 14 550.

Humphreys et al., *Minerals Processing,* p. 16 (Mar. 1970).

Dow Starts a Coal Gasification Plant, *Chemical Week,* May 13, 1987.

KR Process-A Coal-Based Alternative to the Blast Furnace, *Iron and Steel Engineer,* Feb. 1986, pp. 30-33.

Coal Ash Usage: Producing Mineral Wool from By--Products, *Minerals Processing,* Mar. 1970, pp. 16-21.

Utilization of By-Products from Western Coal Combustion in the Manufacture of Mineral Wool and Other Ceramic Materials, *Cement and Concrete Research,* vol. 14, pp. 513-520, 1984.

*Steel & Coal,* 185, 304 at p. 305 (Aug. 17, 1962).

Rammler et al., *Energy Progress,* 2, 121 (1982).

*DOE Report,* "Development of an Advanced, Continuous Mild Gasification Process for the Production of Co-Products-Industrial Market Assessment of the Products of Mild Gasification", J. E. Sinor et al., Jan. 1988.

*DOE Report,* "Development of an Advanced, Continuous Mild Gasification Process for the Production of Co-Products-Literature Survey Results", W. G. Willson et al., Jan. 1988.

*Clean Coal Technologies,* 89, 9 (1989).

FIG. I

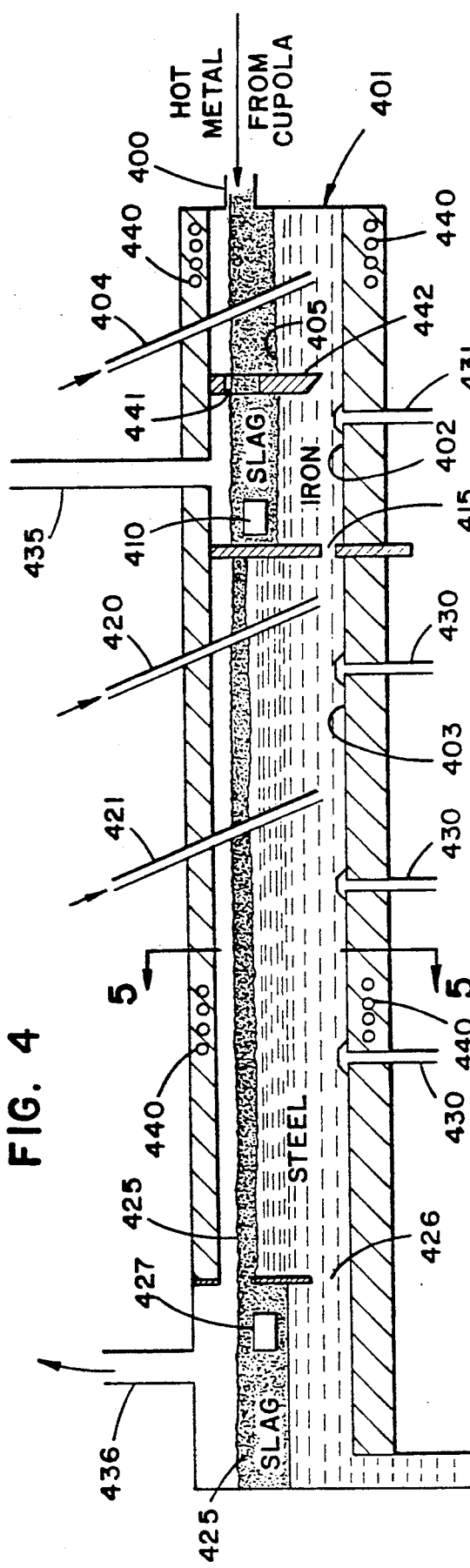
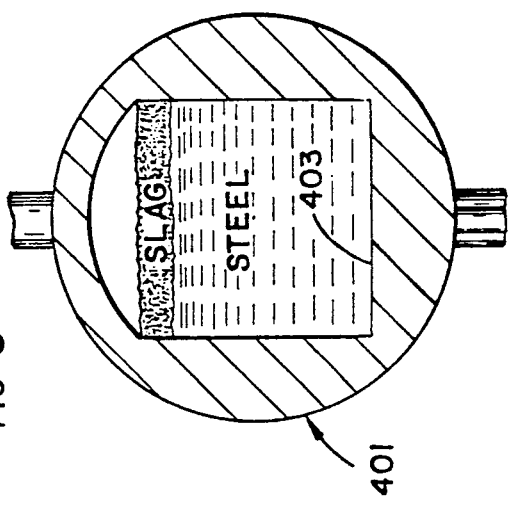

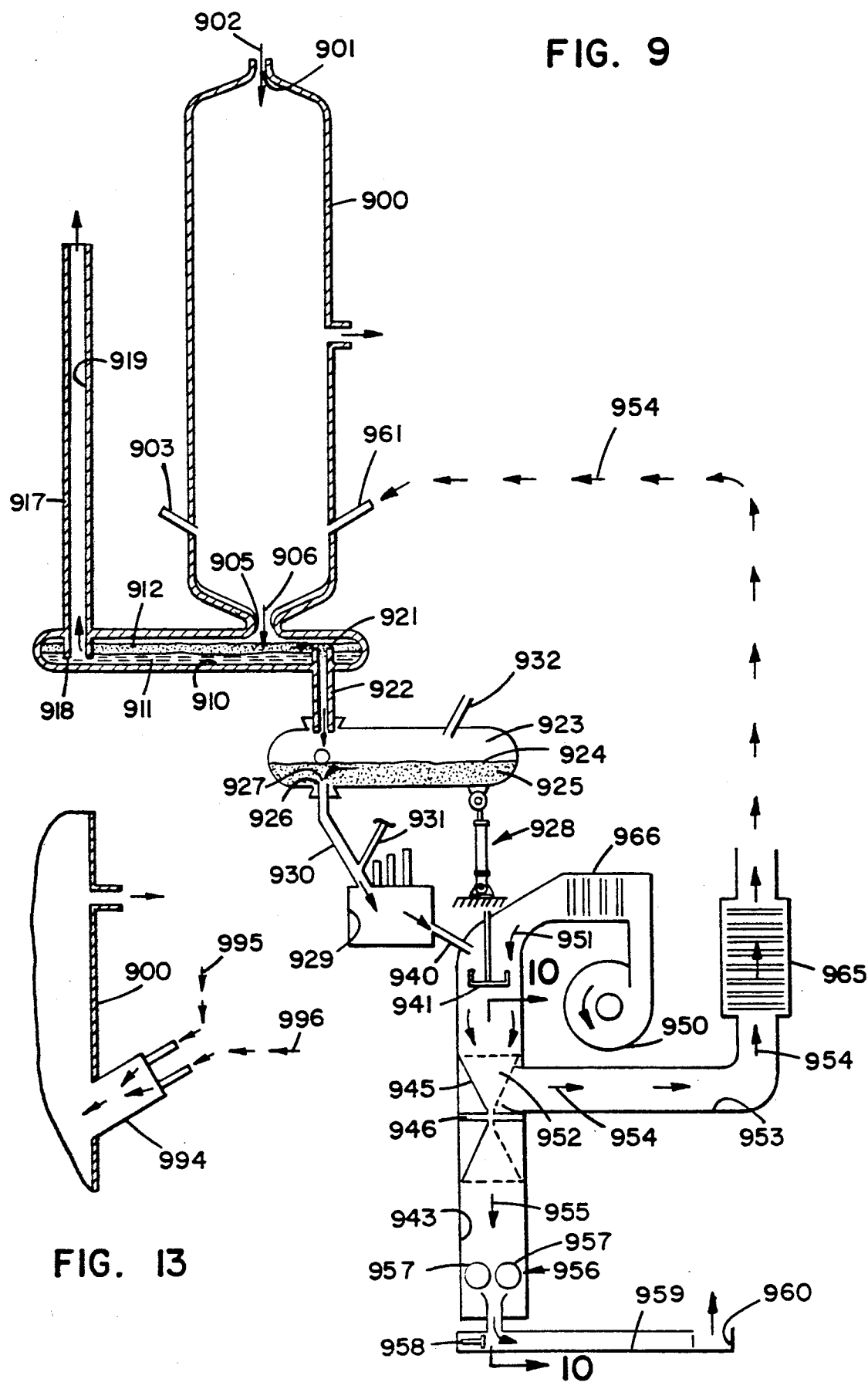

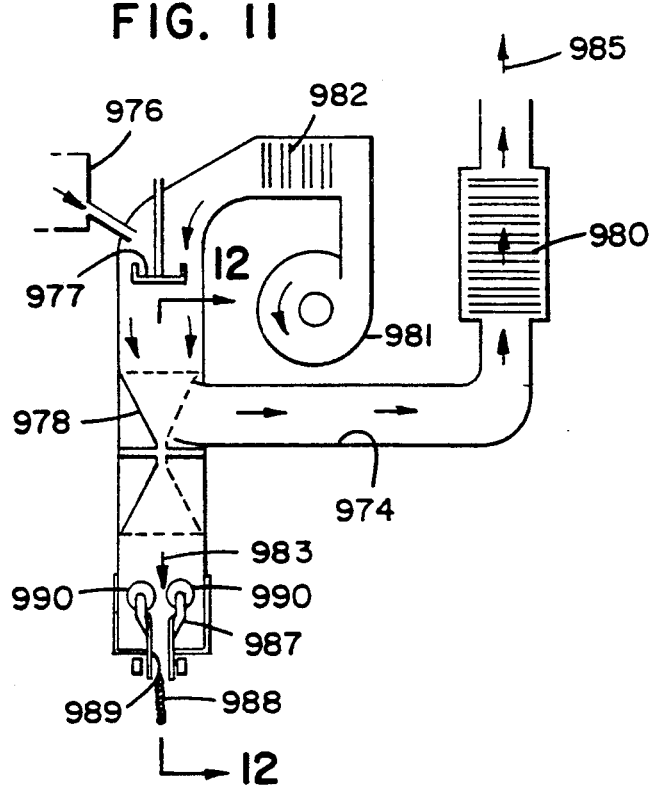
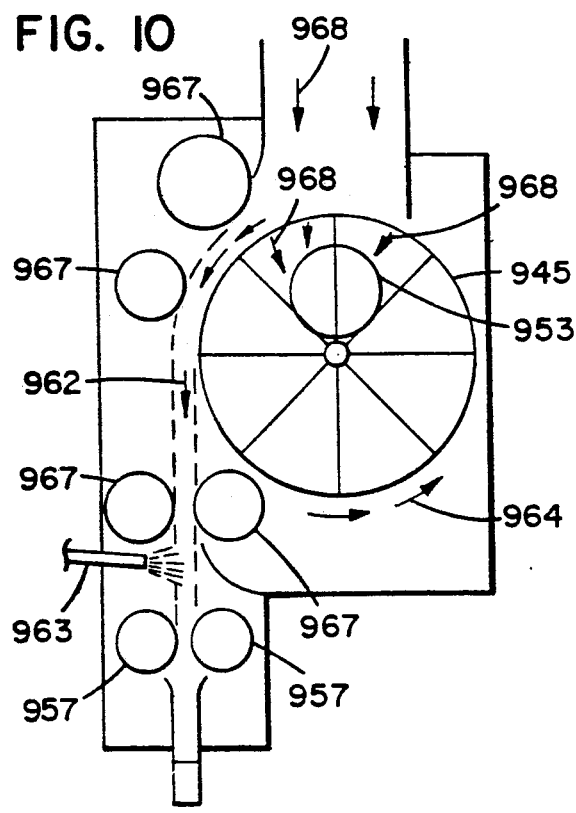
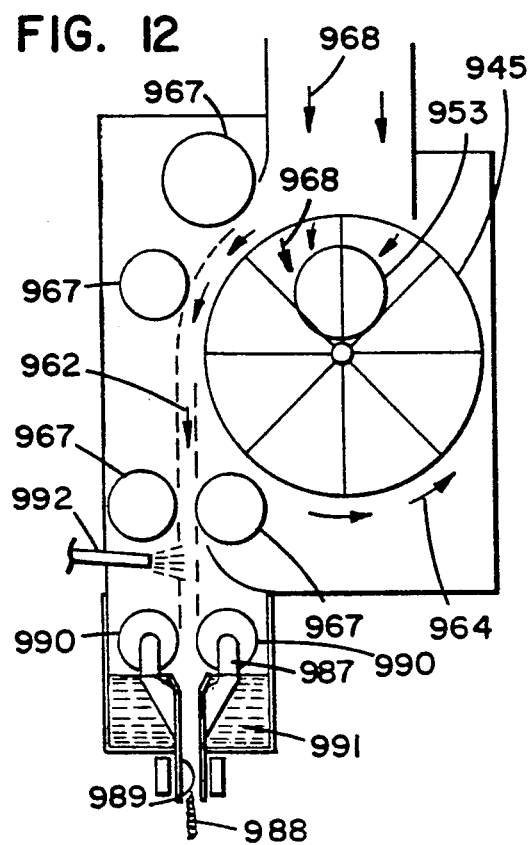

COGENERATION PROCESS FOR PRODUCTION OF ENERGY AND IRON MATERIALS, INCLUDING STEEL

CROSS-REFERENCE TO RELATED APPLICATIONS

This application is a continuation-in-part of application Ser. No. 07/234,914, filed Aug. 22, 1988, which is a continuation-in-part of application Ser. No. 07/153,242, filed Feb. 8, 1988, which is a continuation-in-part of application Ser. No. 07/091,427, filed Aug. 31, 1987, which has been abandoned in favor of continuation application Ser. No. 07/423, 615, filed Oct. 16, 1989.

FIELD OF THE INVENTION

The present invention relates to thermoelectric power generation. In particular, the invention concerns the generation of power, from coal. A cogeneration process is involved, whereby a coal fuel is treated in a liquefaction procedure or step, for removal of valuable oils and the like therefrom. The resultant low-volatiles char is then usable in an iron reduction and melting process. During the high temperature iron refining process, product gases are generated. The gases are used, directly and/or indirectly, to power turbines and generate electrical power. The overall process particularly concerns a system in which advantage is taken of the characteristics of each individual step or stage, to facilitate an overall relatively energy efficient process. In a preferred application, steel is generated from a product of the iron reduction and melting process.

In an advantageous arrangement, iron is reduced under pressure greater than atmospheric pressure, generating gases under pressure which may be utilized to more efficiently power turbines and generate electricity. The present invention addresses the associated problem of handling molten metals under pressure. The invention also concerns a preferred method of handling slag material from the iron reduction step.

BACKGROUND OF THE INVENTION

In recent decades achievement of efficient and relatively inexpensive electrical energy production has become a major concern. Of the various types of power plants, coal-burning plants have been particularly popular and widely used. The reasons for this include relative adaptability to a variety of locations and relatively wide availability of a comparatively inexpensive fuel.

A problem with conventional coal burning systems involves the general methodology of fuel use. In a typical system the coal is simply burned, with the waste discarded. This has generated two substantial concerns. First, coal fuels often include therein relatively useful organic fractions, which could be isolated and refined to useful oil products, such as diesel fuel or the like. Typically in conventional plants these fractions are merely burned, as an inexpensive fuel, along with the remainder of the coal. It is readily seen that this, arguably, is an inefficient utilization of the coal as a natural resource.

Secondly, conventional systems generally require a relatively high grade of fuel coal. For example, coal having a substantial amount of sodium therein is not readily utilizable, as it does not burn well. If such materials in the coal were first extracted therefrom, a lower grade coal could be effectively used as a fuel source.

Methods of coal liquefaction, i.e. the removal of volatile materials from coal, are well-known. Generally, however, such processes have not been practiced on coal to be utilized as a fuel for power generation. A major reason for this is that the resultant coal char has not been a desirable fuel. While such char has a significant energy content, it generally does not burn well and cleanly in conventional boilers. Thus, the use of char has been resisted by power companies.

Coal, typically in the form of metallurgical coke, is also utilized in the steel-making industry, for example to reduce oxides of metals such as iron. In one known process, coal products are pelletized with water, silica, burned limestone and taconite, and are treated in a high temperature oven such as a cupola. The pelletization step is generally conducted in an autoclave. To date, this method of generating metallic iron has received minimal attention.

What has been needed has been a more efficient method of energy production, utilizing, as the ultimate source of fuel, coal and coal products. More particularly, what has been needed has been a method of energy production wherein values other than simply crude fuel values of the coal fuel are more efficiently and effectively utilized, for example in iron refining and boiler operation. A particularly useful process would be one in which steel production occurs, as a by-product to energy generation.

If iron were to be reduced under pressures greater than atmospheric, the efficiency would arguably be increased as output gases have a greater energy content which can be extracted to generate electricity. Thermal efficiency would also be increased and higher gas concentrations and faster reaction rates would be obtained, thereby resulting in better overall reduction. A high pressure cupola would require smaller containers for output gas purification, thereby allowing for off-site assembly and much lower cost. The use of pressurized reduction has been avoided in the past, at least in part because molten metals under pressure present special handling problems.

When iron oxides are reduced in the presence of carbonation materials, molten iron and slag are produced. The slag has generally been considered a waste product. However, if it is produced in a large scale operation, handling of the slag can involve considerable expense. It would be preferred to have an overall system designed for an efficient handling of any slag material generated in a reduction furnace.

OBJECTS OF THE INVENTION

Therefore, the objects of the present invention include: to provide a process for the generation of electrical power from coal fuel, wherein oil values in the coal are selectively removed before the coal is utilized as a fuel; to provide a preferred such method wherein following a liquefaction procedure a resultant coal char product is utilized in a reduction and melting process for the reduction of oxidized iron; to provide a preferred such process wherein, during iron refining, high pressure hot product gases are formed which are utilized for the production of electricity, upon passage through a turbine arrangement; to provide a preferred such process wherein the turbine arrangement preferably includes, in series, a gas turbine directly driven by gases from the iron refining process, and a steam powered generator, driven by steam produced in a boiler heated from a hot gas effluent from the gas turbines; to provide a preferred such process wherein steam generated in a boiler from hot effluent gases, from an iron refining process utilizing coal char, are in part utilized to provide a heat source for coal liquefaction in order to initially generate char material; to provide a preferred overall process for the generation of oil products, the reduction of iron oxides, and the generation of electricity, which utilizes coal as the primary fuel source and source of reductant; and, to provide a preferred such process which is relatively energy efficient, relatively simple to effect and which is particularly well-adapted for the proposed applications thereof. It is another object to the present invention to yield an overall preferred process including a step of generation of steel, from products generated by the melting process. A further object to the present invention in an advantageous arrangement is to provide a process for the reduction of iron under pressure greater than atmospheric pressure, thereby producing hot output gases under pressure which may be utilized in a further step of electrical power generation, the output gases under pressure having a substantial energy content, thereby effecting more efficient energy production; and, to provide a preferred such process wherein molten metal under pressure is forced up a vertical tap arrangement, thereby using the weight of the metal to counterbalance the pressure and allowing the metal to be selectively tapped at a height wherein the head pressure of the metal is near atmospheric or some other selected pressure. Further objects to a preferred embodiment include providing for efficient handling of slag material formed during iron reduction, and, providing for efficient char use, preferably without a separate autoclave process. Other objects and advantages of the present invention will become apparent from the following descriptions, taken in connection with the accompanying drawings, herein and set forth by way of illustration and example of various embodiments and applications of the present invention.

SUMMARY OF THE INVENTION

The present invention concerns an overall process and plant design for the utilization of coal in an efficient process, wherein energy is relatively efficiently produced and relatively low cost iron refining is achieved. Further, potentially valuable oil products are extracted from the coal fuel source, and are made available for use in a variety of industries including the fuel industry, such as the diesel fuel industry. The overall process can more readily be understood if viewed as divided into a plurality of individual steps and stages; however, as will be understood from the detailed description, certain advantages are obtained from organization of the various stages into an efficient interdependent system, for example wherein energy from various stages is utilized in a relatively efficient manner to help drive other steps and stages. This will be readily apparent from the schematic representations described in detail below. The result is an overall useful plant construction, providing for oil generation, iron refining and energy production with relative cost efficiency. In certain preferred embodiments, product from the iron refining stage is utilized in a steel making procedure.

It will be appreciated that refinement of iron under pressure greater than 50 psia (345 kPa) has an added benefit of producing output gases under pressure. These pressurized gases are potentially useful due to their greater energy content than gases at atmospheric pressure, and therefore can produce more energy when used to drive a turbine. Problems associated with controlling pressurized molten metals in a pressurized refinement process has deterred acceptance of such an arrangement. In an advantageous arrangement, the pressure of the gases and weight of material within the cupola or reactor drives the metal up a vertical tap arrangement. The weight of the metal counteracts the pressures, so that at some height the head pressure of the molten metal is reduced to near atmospheric, solving the handling problems. The molten metal may then be tapped with relatively safe and easy handling.

During a first stage of the present invention, coal, provided as a fuel source, is treated in a liquefaction step, for the removal of volatile fractions therefrom. Simultaneously, undesired mineral values may also be extracted. An advantage to this latter, is that those mineral values which might otherwise interfere with desired utilization of the coal as a fuel source are removed early in the process. Thus, a relatively low quality coal can be used in a process according to the present invention. As a result, cost efficiency and effectiveness are enhanced.

A variety of liquefaction procedures may be utilized during the liquefaction step. One method is solvent extraction followed by pyrolysis. Typically, a phenolic solvent will preferably be utilized, to initiate the extraction procedure. This will be followed by a relatively mild pyrolysis, using steam and oxygen, to drive off volatiles, remove additional valuable liquid fractions and to generate a low volatile char product for use in the iron reduction procedure, i.e. the next stage.

Alternatives to the specific liquefaction procedure described above include: hot water treatment followed by water/steam extraction, rather than organic solvent extraction, and a mild pyrolysis; steam extraction only; and, pyrolysis only. The combination of organic solvent extraction and mild pyrolysis is generally preferred, for its energy efficiency and ability to achieve removal of substantially all relatively volatile components, leading to a particularly desired char for reduction purposes.

Char generated from a liquefaction step is usually fairly active, and is generally in a powdered form. Such material may spontaneously burn upon exposure to air, if dry. Thus, if it is to be stored for any considerable period of time, it is usually preferred that it be placed under an inert atmosphere and/or wetted down somewhat, typically about 30% moisture by weight being sufficient to inhibit combustion.

The char material's active quality will make it a good substitute in many uses for activated carbon, for example in water purification. The high cost of activated carbon will make the char material a cost efficient source. Use in a purification step will have no substantial detrimental effect on the char material's usefulness in subsequent iron reduction processes, as the energy content is not reduced.

Following any use as an activated carbon, or directly if no such use is made, the char material will be prepared for utilization in an iron reduction and melting step. In one embodiment, this is preferably done through a pelletization process, wherein the char material is mixed with a binder, usually including lime and silica, and is treated with steam for induration, i.e. hardening into pellet form. The pellet form generally enhances the chemical reactions of iron reduction, and makes the char material easier to handle and less likely to be blown about by gases in the reactor of the iron reduction step.

As previously suggested, coal pelletization is, to a certain extent, known technology. In general, according to the known process the pellets are hardened in an autoclave in order to ensure they will retain their integrity when stored or used.

If the stage two reduction is conducted under sufficient pressure, then the pellets of coal char can be put into the reactor system without having been previously hardened in an autoclave. A reason for this is that the high temperatures, and high pressures, of the reduction furnace can be utilized as an initial treatment of the coal char pellets, to harden them. Then, as the pellets move through the reactor they will effect the metal reduction. This is a particularly advantageous method of conducting the operation, since expensive autoclaves can be avoided and, as will be discussed below, efficiency is increased.

Char material formed during the First Stage described above, can be utilized for the reduction and melting of a variety of iron materials including iron ores such as taconite, and also scrap metal iron; i.e. partially oxidized iron. If partially oxidized scrap metal iron is utilized, pellets made as described above are typically mixed directly with the scrap metal irons and the refining process is run. If scrap iron, already substantially reduced, is used, the process is still very cost efficient, as melting in a smelter device used in the present arrangement is generally more cost efficient than melting in a standard furnace, and advantages in the overall power plant operation result. If iron ore, such as taconite, is utilized, then preferably some of the char material is pelletized with the taconite itself, again the pellets including a binder.

In Stage Two, iron oxides are reduced, typically in a smelter device such as an oven or cupola, in the presence of the char material which acts as a fuel and a reductant. The products of a typical Stage Two generally include slag, liquid metals, and hot gases. The hot gases are utilized, directly and/or indirectly, to generate electrical power in the third general stage. In some embodiments Stage Two conditions may be varied slightly, for advantages. For example, chromite may be included into the pellets, to generate stainless iron. Also, kiln conditions may be used to form directly reduced iron. In advantageous auxiliary processing steps to stage 2, the reduced iron oxide material can be refined into steel, for example by operation of the kiln (cupola, furnace or reactor) or additions to the kiln, with gas and mineral injection.

It is advantageous, in certain processes, to operate Stage Two reduction under pressure, with the output gases generated under substantive pressure. More efficient Stage Three power generation is obtained with pressurized gases to drive turbines. In an advantageous and preferred arrangement of the present invention under pressure, problems associated with production of pressurized molten metal are addressed by a vertical tap arrangement for lowering the pressure. The pressure of the gases forces the metal up a vertical tap arrangement. As the metal rises, its own weight offsets the gas pressure so that at some elevation, the molten metal head pressure is reduced to atmospheric or near atmospheric and the molten metal may be tapped for further handling.

In the iron reduction operation, considerable slag material is formed. In preferred applications, as is described in detail below, slag material is drawn off in a preferred manner, and is utilized to generate a fiber product. An advantage to this is that the material, which would otherwise be an industrial waste, is provided with at least some commercial value. In preferred applications, heat energy from the hot slag is recovered. In certain of these applications, the heat energy is used in a preferred manner, to facilitate the reduction operation.

In an alternate Stage Two embodiment, the coal char material is mixed with lime and is gassified. The coal gas is then brought into contact with iron material to be reduced and melted. In a preferred system, the coal char is gassified in a chamber such as a conventional melter/gasifier. Iron material, such as ore, is fed into a separate chamber, wherein it is exposed to hot coal gas from the melter/gasifier. The reduced ore material is then fed directly into the melter/gasifier wherein it is melted, and drawn off as pig iron. This pig iron material may be refined to steel, as described below.

Stage Three involves utilization of the hot gas effluent from the cupola or reduction and melting process generally. In some embodiments, the cupola may be structured to operate under substantial pressures, to enhance efficiency and reduce residence time. In others, relatively low pressure processes may be used. In either case, the hot gases escaping from the reduction and melting process include generally about 30–40% carbon monoxide therein, among other gases. The rapidly cooling gases may be of relatively low temperature, 300°–600° F. (149°–316° C.), in comparison to the cupola operating temperature, usually well above 2,000° F. (1,090° C.). (typically about 2,500°–2,900° F. (1,370°–1,590° C.)), and generally include particulate matter such as char dust therein. For a typical process, the escaping gases are passed through a filter arrangement or the like, for removal of the solid particulate manner. It is noted that the escaping gases from the reduction melting processes, especially under considerable pressure, provide for at least one of the reasons why the char material placed into the process should include a binder therein, and is preferably pelletized either before entry into the system, or early in the system. That is, if no binder is involved, and if no treatment to involve hardening takes place, the char material would tend to be blown out of the cupola or furnace, by the escaping gases.

In preferred Stage Three procedures, the waste gases are directed into a burner, wherein they are ignited in the presence of oxygen, to oxidize the carbon monoxide and increase the temperature of the gases considerably, typically to over 2,000° F. (1,090° C.). These very hot gases, having substantial energy, may then be driven into a gas turbine arrangement, whereat the energy of the gases is utilized directly for the generation of electricity. This is particularly desirable if the gases are under substantial pressure from an advantageous arrangement wherein the cupola is pressurized. A high pressure gas turbine is an effective means of tapping the energy represented by the pressure of the output gases. The cooler, lower energy, gases admitted from the gas turbine arrangement are then preferably directed into a boiler, for the generation of steam. Steam generated by the boiler may be utilized to drive a steam turbine, and produce electricity. Further, hot steam generated by the boiler may be utilized to facilitate many of the steps; for example as a heat source for the solvent and/or steam extraction/liquefaction of Stage One.

As the hot gases leave from the boiler, they still contain substantial heat which may be effectively utilized to facilitate processes according to the present invention. For example, these hot gases may be driven through a heat exchanger to heat air that is directed to various steps of the process, including air directed into the hot blast cupola in Stage Two, or any other Stage Two equipment.

In the schematic representations discussed in detail below, particularly efficient systems utilizing steam generated in a boiler, and heat generated from the reduction and melting steps, are shown. The drawings constitute a part of this specification, and include exemplary embodiments of the invention, while illustrating various objects and features thereof. It will be recognized that the drawings, being schematic only, indicate general embodiments, and a variety of specific arrangements may be utilized according to the principles of the present invention.

BRIEF DESCRIPTION OF THE DRAWINGS

FIG. 4 is a schematic representation of a portion of a plant system according to an alternate embodiment of refining molten metal material drawn off of the cupola, to steel.

FIG. 5 is a schematic, cross-sectional view taken along line 5—5, FIG. 4.

FIG. 9 is a schematic representation of a portion of a plant system according to an embodiment of the present invention, wherein slag material drawn off the reactor is refined to a mineral fiber material.

FIG. 10 is a cross-sectional view taken generally along line 10—10, FIG. 9.

FIG. 11 is a schematic representation of a portion of a plant system according to an embodiment of the present invention involving an alternate refinement of slag material to that shown in FIG. 9.

FIG. 12 is a cross-sectional view taken generally along line 12—12, FIG. 11.

FIG. 13 is a schematic representation of a reactor port showing coal fines and air injected for use as a burner.

DETAILED DESCRIPTION OF THE PREFERRED AND ALTERNATE EMBODIMENTS

As required, detailed embodiments of the present invention are disclosed herein. However, it is to be understood that disclosed embodiments are merely exemplary of the invention which may be embodied in various forms. Specific structural and functional details disclosed herein are not to be interpreted as limiting, but rather as a basis for the claims and as a representative basis for teaching one skilled in the art to variously employ the present invention in virtually any appropriately detailed system.

In general, the process according to the present invention will be described in terms of three stages: a First Stage in which coal is treated for the formation of char and the removal of oil values; a Second Stage in which the char product is utilized in an iron-refining operation, to generate useful high pressure hot gases and reduced iron which may be refined to steel; and, a Third Stage in which high pressure hot gases from Stage Two are utilized in the generation of electricity. In a preferred arrangement as described and shown, the three stages are interacted, so that energy generated in each stage is effectively utilized throughout the entire process, in a preferred manner. This interaction, and advantages therefrom, will become more apparent from the following descriptions.

Stage One—Processing of the Coal to Generate Char and Coal Oil products

Figure 1:
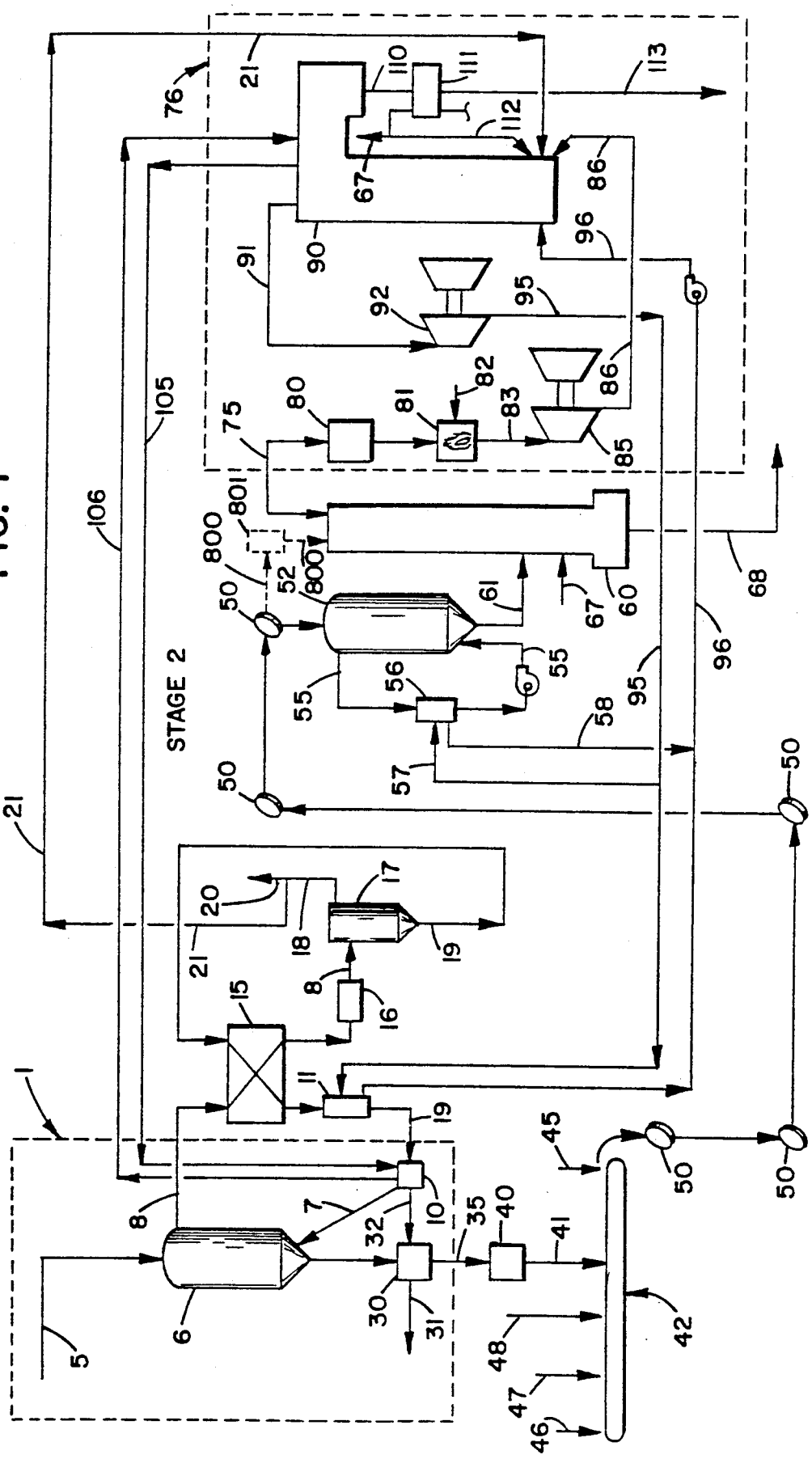
FIG. 1 is a schematic representation of a plant system for implementation of a process according to the present invention.

FIG. 1 will be understood to represent a power plant operated according to the principles of the present invention. Referring to FIG. 1, the reference numeral 1 generally designates Stage One of the process, wherein coal is treated to form char, with oil materials extracted therefrom. At reference numeral 5, a coal feed is represented. A variety of grades of coal may be utilized in processes according to the present invention, in some instances including those grades which include too high a mineral content to generally be efficient as a conventional boiler feed stock.

In the First Stage, extraction/liquefaction procedures are preferably employed to remove materials from the coal feed stock. A variety of methods are utilizable in processes according to the present invention. Generally, what is required is the ultimate removal of relatively volatile components and also extraction of mineral components, from the coal, to leave a char material having relatively low volatiles content.

In a preferred application of the present invention, coal feed 5 is directed into a liquefaction system including an autoclave 6, whereat it is extracted by a solvent, such as a phenolic solvent or water/steam. Generally, extraction with a phenolic solvent at about 350° to 420° C., 450 psia (3,100 kPa), is effective to rapidly extract volatile materials out of coal. The hot solvent is represented fed into the autoclave via line 7, and as removed therefrom via line 8. The solvent, in FIG. 1, is shown at least partially heated by heat exchangers 10 and 11, described in further detail below. Heat exchanger 15 is positioned to cool the solvent from the extraction, directing same also through cooler 16 and into separator 17, wherein the extracted oil materials are separated from the solvent. The separator 17 may be of any of a variety of types, including conventional ones, and specifically including distillation systems, with the oil product being taken off at line 18 and the solvent being drawn off at line 19 and redirected into the autoclave 6, along line 7. For the embodiment shown the solvent, via line 19, is directed through heat exchanger 15, as well as heat exchangers 10 and 11, so that it is heated sufficiently to generate the extraction via a continuous method. The volatiles removed via line 18 are shown separated into two components, at lines 20 and 21. Separation techniques, not detailed, including conventional ones can generally be utilized to separate more valuable coal oils, such as oils utilized as diesel fuel or the like, at line 20, with less valuable but readily burnable materials being directed via line 21 into a Stage Three boiler, described below, as a supplemental fuel source. Generally, at least about 65 gallons of useful oil can be extracted from a ton of coal.

At a second step in a preferred Stage One liquefaction system, partially extracted residue from the autoclave 6 is directed into a pyrolysis oven or chamber 30, for mild pyrolysis, to enable selective reduction of volatiles as far as reasonably possible. A reason for this is that it is desired to use a char with relatively little volatile material therein, in the iron reduction step of Stage Two. Typically, pyrolysis at about 600° C. and 1 atm., in the presence of steam and oxygen, readily extracts the remaining volatiles along line 31, leaving the char residue in a powder form. This relatively mild pyrolysis is advantageous, since it has relatively low energy demands, which can at least in part be met via heat supplied by heat exchanger 10. The volatiles drawn off via line 31 can be collected by conventional means, as desired. A steam circulation system, providing for a continual feed via line 32 from heat exchanger 10, can be provided, for example, in a conventional manner, if necessary or desired.

It will be understood that extractions and pyrolyses such as described may be used to remove metal salts from the char, as well as organic volatiles. Char material is shown being removed from pyrolysis oven 30, via line 35. Again this char material preferably has been treated until it has a relatively low volatiles content, and is well-suited for utilization in Stage Two as described below.

A variety of alternate liquefaction procedures can be utilized, including a two-stage liquefaction with hot water pretreatment and a water/stream extraction being utilized in place of the organic solvent. Generally, such a system would require a follow-up low temperature pyrolysis, to be an effective treatment in an overall process according to the present invention. Hot water pre-conditioning of the coal material facilitates extraction via the steam process. Such a process should typically involve, for example, pretreatment with water at about 200° C. for a brief period, typically 15-25 minutes, followed by steam extraction at about 375° C. and about 750 psia (5,170 kPa). The follow-up pyrolysis can be as described above, in oven 30 for example at about 600° C. and atmospheric pressure.

Single step liquification processes may also be adaptable for utilization in association with systems according to the present invention, although generally such systems may be less efficient as they do not as readily lead to char having a very low volatiles content; or, when they do, they produce less of the valuable liquid products. In one type of single step system, only a pyrolysis process would be initiated, with the extraction process in the autoclave 6 being bypassed. In a second, only extraction in the autoclave 6 would be done, with a pyrolysis at 30 being bypassed. It will be understood that the liquefaction process chosen will generally depend upon cost, the nature of the coal feed, and the char product desired.

The active char material is suited for use as an activated carbon, for example in water purification. The char material may be used for purification and then further utilized in reduction of metals. Use in purification does not substantially decrease the char materials effectiveness in reduction, as the char's energy content is not substantially affected. Activated carbon or charcoal is quite expensive. Char material provides an inexpensive source of such active material with a follow-up use of the deactivated char product, in iron refining or steel production. Alternatively, the activated char product may be used directly in the iron refining or steel production.

Regardless of the method of liquefaction chosen, the general process requirement is to provide a low volatile char material for direction into Stage Two. In addition it is preferred to accomplish char generation in a relatively low cost, energy efficient, manner possible. It will be readily understood that the solvent extraction/mild pyrolysis steps described in detail above will be generally advantageous as extreme conditions and long reaction times are generally avoided.

Stage Two—Reduction of Iron Material; Refinement to Steel

In Stage Two of a process according to the present invention, iron materials are reduced and/or melted to irons for use in the manufacture of steel and the like. The iron material to be reduced and/or melted may be from a variety of sources, including iron ores and scrap metal iron; i.e. partially oxidized iron. Generally, according to the present invention relatively expensive coke material is avoided and is replaced with a relatively low cost byproduct of energy productions, char, in a process for the manufacture of relatively inexpensive iron and steel products. This is accomplished, generally, as follows.

Char from takeoff 35 is generally in a powdered form, and is often highly reactive. If exposed, dry, to oxygen, spontaneous combustion is possible and likely. Generally, rather than being stored the material is pulverized if necessary, and for preferred applications is formed into pellets for use in an iron reduction reaction. In general, the pelletization is preferred at least for the reason that it provides an integrity to the char, for later handling. That is, for example, if the char material is to be utilized in a system involving a through-flow of gases, unless pelletized the char material will have a tendency to be blown out of the system.

The nature of the pellets formed will depend, in part, upon the nature of iron material to be reduced and/or melted. Generally, a variety of iron sources may be utilized in processes according to the present invention. Most typically, several major sources will be used: oxides, for example in the form of iron ore, such as taconite; scrap metal iron; and, waste oxides, for example created during steel production and manufacturing processes. Scrap metal iron, it will be understood, generally includes a considerable amount of iron oxides therein.

In FIG. 1, a process utilizing taconite is illustrated. The char material, after grinding in mill 40, is directed via line 41 into a mixing and pelletization system 42, wherein it is pelletized with various binder materials, and, if necessary or desired, the iron ore. A variety of conventional pellet forming mechanisms such as mixer-mullers and pelletizing discs may be utilized as part of system 42. Generally, what is required is that the char material be mixed with ore, shown introduced via line 45, in a manner ensuring pellet formation. To accomplish pellet formation, binder materials such as water, silica and burned limestone are added, in small amounts, to the pellets. In FIG. 1, water, silica and limestone are shown fed via lines 40, 47 and 48, respectively. These materials enhance agglomeration, under application of heat.

Typically, pelletization includes formation of a plurality of small pellets, about ¼-1½ inches (0.6-3.8 cm) in diameter, each including, by weight, about 10-18%-char, about 60-80% taconite, about 8-15% water, and about 1-8% burned lime, although variations may be used. Such pellets are generally readily agglomerated and provide sufficient association of the carbon (char) with the iron, to facilitate the reduction process when heat is applied.

Agglomeration is generally facilitated by application of heat and steam. Referring to FIG. 1, the pellets 50, formed by pellet maker 42, are shown directed via line 51 into autoclave 52 for induration. In autoclave 52, heat and steam are applied, to provide for a stable, hard, pellet material. Typically, steam at about 175°-225° C., under pressures of 75-300 psi (517-2,070 kPa), may effectively be utilized to generate the hard particles. It will be understood, however, that a variety of pressure and temperature conditions may be utilized, depending upon the specific pellet composition involved, and the pellet use intended. Further, optimization of temperature and pressure may be found empirically for various systems, to enhance energy savings and achieve a desired induration time.

Pellets, such as those previously described, may be directed into an oven or reactor such as a cupola, for reduction of the iron. In some instances, however, rather than taconite or iron ore, scrap metal iron may be utilized. Under such circumstances, generally the pellets of char material should be formed without the iron mixed directly therein, but rather only from char material containing enough silica, limestone and/or water to provide efficient agglomeration. For this latter modification of the process, generally the char pellets would be charged into the cupola, as a mixture with scrap metal iron. Also, in some instances the cupola may be operated as a melter only, without substantial reduction of metal material therein. In such circumstances the pelletized char could also be used without metal oxides.

As previously indicated, the autoclave is used to harden the pellets to give them sufficient strength to survive later handling until they reach a point whereat they being to melt. The structural changes that take place within the pellets during autoclave treatment, are primarily a series of chemical reactions in which excess water is first removed. The remaining water, plus the steam, forms a silicious acid with a silica, and forms calcium hydroxide with the lime. The silicious acid and the hydrated lime react to form a hydrated calcium silicate compound, which creates a gel that permeates the pellet. Heat and pressure dry the gel into a hard skeleton-like structure. The skeleton gives the resulting pellets substantial strength.

Autoclave pelletization of char is known. Operation of the autoclave in such applications generally would involve: a loading of the non-hardened pellets into the autoclave vessel; a treatment with hot air for drying of excess water; a preheating with steam; a curing at about 425° F. (218 C.) and 300 psi (2,070 kPa); and, an unloading operation. It will be understood that when such conventional pelletization methods are applied, a relatively long residence time in an autoclave must be accommodated. Thus, if a large volume of iron is to be reduced in the furnace, and the presence of hardened pellets on a more or less continuous basis is required, a plurality of autoclaves will be necessary. As discussed in details below, an alternate embodiment wherein the autoclave pelletization treatment is avoided to advantage, is possible.

Referring to FIG. 1, since the induration in autoclave 52 is a relatively low temperature process, it can be accomplished at least in part using steam fed from line 55, and heated via heat exchanger 56. The preferred heat exchanger 56, is shown at least in part heated via steam lines 57 and 58, from the boiler of Stage Three. This will be described in further detail below.

Heat and pressure treated pellets from autoclave 52 are shown, in FIG. 1, directed into reactor or cupola 60 via line 61. A variety of conventional cupolas 60 may be utilized in processes according to the present invention. Cupola arrangements producing iron and slag are generally described in "Conclusions on Slagging, Fixed-Bed Gasification of Lignite", by William B. Hauserman and Warrack G.Willson, presented at the 1983 Lignite Symposium at Grand Forks, N. Dak., May 18-19, 1983, incorporated herein by reference. Further, it is foreseen that in some applications cupolas modified for operation at relatively high pressures, for example 100-300 psia (690-2,070 kPa), can be used to facilitate the reduction process. In such applications, energy production is enhanced by using the pressurized cupola for energy production. The output gases have more energy as represented by the pressure, and facilitate more efficient energy production, in manners to be described below. Other oven systems, such as kilns, may be used in some processes.

Generally, feed stock for the cupola 60 is fed in as a solid, piled such that air or the like can pass therethrough. If taconite is to be reduced, typically the iron ore containing pellets are simply piled into the cupola or furnace. Generally one-half of the char material will not be in pellet form and will be agglomerated with the iron. On the other hand, if scrap metal iron is involved, char pellets are mixed into a pile in the furnace, along with the scrap metal. Hot air, used to facilitate the reduction process, is shown fed into the hot cupola 60 via line 67. Gases and minerals can be injected into the cupola, for example via line 67a, for refinement of steel. Slag and molten metal are shown removed via line 68. It will be readily understood that this process comprises a relatively low cost, energy efficient, step in the manufacture of steel products or the like. Further, relatively low capital costs are involved, since high efficiency permits relatively small smelters, reactors or cupolas to be used. The low capital costs are also enhanced by the valuable oil extraction of Stage One, and the relatively efficient energy generation of Stage Three.

Hot gases escaping from the cupola 60 are shown drawn off at line 75. From a typical cupola operation these hot gases will include about 30-40% carbon monoxide, and are at a temperature of about 300°-600° F. (149°-315° C.). In a typical cupola operation, the gas blown into the cupola 60 is preferably around 800°-1,200° F. (425°-650° C.), and in the cupola 60 it is heated to about 2,500°-2,900° F. (1,370°-1,590° C.). The gases are generally rapidly cooling as they transfer heat energy to the materials in the cupola 60. In some advantageous systems according to the present invention, as indicated above, the cupola 60 may be operated under substantial pressures, preferably at least greater than 50 psia (345 kPa) and more preferably on the order of about 250-300 psia (1,720-2,070 kPa) for more efficient energy production, as will be described below. In other instances, pressures near atmospheric may be utilized.

The gases drawn off through line 75 are utilized in Stage Three (reference numeral 76) in a preferred manner, to generate electrical power.

Stage—Electrical Power Generation

In Stage Three, as indicated above, the hot gases removed from the cupola 60 are utilized to generate electrical power. Further, heat from these gases is utilized, as described below, to facilitate the other stages of the process. In an advantageous arrangement, the hot gases from cupola 60 are also under pressure and may be further utilized to generate power, in a manner as described below. Referring to FIG. 1, hot gases from the cupola 60, via line 75, are preferably directed through a filter or cleaner 80, for the removal of particulate material entrapped therein from the cupula process. Such materials include, for example, products from hot gas treatment of the char pellets. This screen or filter process generally is used to protect downstream equipment from injury. Sulfur may also be removed very effectively at this point, with an absorbent, for example, in the gas screen.

As previously indicated, the gas in line 75 includes a substantial amount of carbon monoxide (generally 30–40%) therein. Advantage may be taken of this carbon monoxide content. In particular, the carbon monoxide is oxidized with air, at burner 81. This will increase the temperature of the gas to near 1,800°–2,200° F. (980°–1,200° C.), and further leads to the destruction of the potentially hazardous carbon monoxide. Air for the oxidation is shown fed into burner 81 via line 82. Hot, oxidized, gas is shown drawn off at line 83.

The high temperature, high pressure gases from burner 81 are preferably used for the generation of electricity. It will be readily understood that there are advantages to the utilization of gas under substantial pressure from the cupola 60, as more efficient turbine operation is achieved. Gases under pressure have a greater energy content which can be tapped to drive high pressure gas turbines, thereby accomplishing more efficient energy production. For preferred plant systems, gas turbine 85 provides for energy production, from cupola gases.

After passing through the gas turbine 85, the hot gases, illustrated by line 86, in preferred processes will still represent a substantial energy source, due to their still relatively high temperature, typically about 800°–1,100° F. (425°–595° C.). These waste gases are shown directed into boiler 90, for the generation of steam. The steam may be utilized in a variety of manners. For example: Steam line 91 is shown being used to drive turbine 92, for the production of still more electricity. The outlet steam line 95, from turbine 92, is shown providing heat to heat exchanger 11, which is utilized to drive the original extraction in Stage One. Also, outlet line 95 is shown communicating with heat exchanger 56, via lines 57 and 58, to provide an energy source for induration of pellets in Stage Two. Ultimately, steam or water is returned to boiler 90, via line 96. It is noted that turbine 85 can be used to drive a compressor, for example to furnish pressurized combustion air to the cupola 60 or to line 82.

Very hot steam, on the order of 400° C. or higher, is shown being drawn off of boiler 90, via line 105. This steam is directed via line 105 into heat exchanger 10, to facilitate the original extraction process and also the pyrolysis process. Once cooled, this steam/water is returned to the boiler via line 106.

Heat feed to the boiler 90 may be from a variety of systems. For the preferred system according to the present invention, the majority of the heat drive is provided via the hot gases drawn off of the cupola 60, indicated in line 86. Other sources of heat include energy derived from the less important and less valuable coal oil products, shown directed into boiler 90 via line 21.

Hot gases escaping from the boiler 90 are shown drawn off at line 110. Such gases are still relatively hot, and can be utilized in heat exchanger 111 for a variety of purposes, including to heat air used in boiler 90, shown introduced via line 112, and also to help heat air directed into the cupola 60, shown in line 67. Ultimately, the gases from line 110 are discharged to the atmosphere, as indicated in line 113. Typically, they first pass through a scrubber arrangement or the like, not shown, which may be of a conventional construction and is used for pollution control. While the gases include substantial amounts of carbon dioxide, overall emissions can be lower than for conventional systems wherein less efficient use of the coal is made.

From the above descriptions it is readily understandable that an advantage to the present invention is that an overall interdependent system is provided, wherein coal is very efficiently utilized in a combination energy generation and iron refining facility. Relatively highly valuable components in the coal, i.e. the coal oils, are originally extracted. A formerly low value char material is utilized both to reduce iron, and lessen the costs of iron and steel production, and to produce a heated gas product facilitating efficient energy generation. The system can be utilized on a large scale, to produce large amounts of energy, since the fuel is efficiently utilized.

Alternate Stage Two Operation

Figure 2:
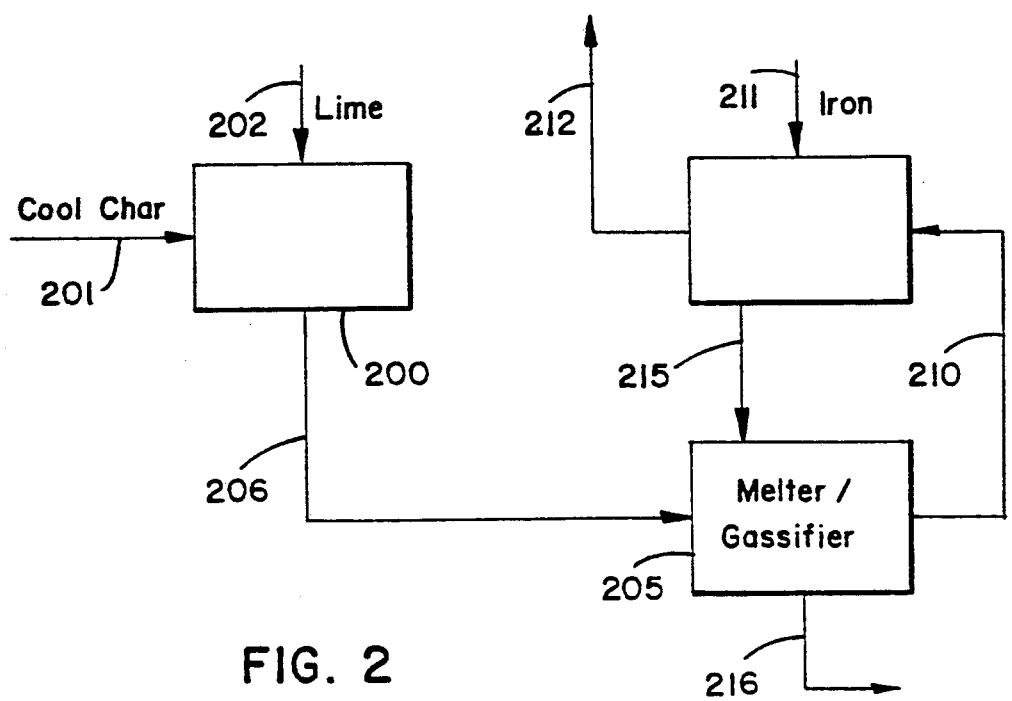
FIG. 2 is a schematic representation of a portion of a plant system according to an alternate embodiment of the present invention.

In an alternate Stage Two operation, a pelletization procedure is avoided. Referring to FIG. 2, the coal char from Stage One is fed into pressurized feed bin 200 via line 201, wherein it is mixed with lime fed via line 202. This mixture is fed under pressure into a conventional melter/gasifier 205, via line 206. In melter/gasifier 205 sufficient heat is provided to gassify the coal char. Off gases are fed via line 210 into a reduction furnace which includes therein oxidized iron material such as ore, fed via line 211. The off gases from the reduction are removed via line 212, and are used analogously to off gases from a cupola as previously described. For a typical system, the reduced iron material is fed via line 215 directly into the melter/gasifier wherein it is melted and removed via line 216.

Modified Process for the Production of Steel

Processes conducted in the cupola, or in association with the cupola, can be utilized to generate steel products, as opposed to mere iron products. As previously suggested, line 67a, FIG. 1, generally represents selected introduction of various gases and minerals into the cupola, for the generation of steel. Two preferred manners and systems for conduction of steel generation, in processes according to the present invention, will be understood by reference to FIGS. 3, 4, and 5. These figures schematically illustrate multi-chamber refining units which can be used in association with a cupola, to provide preferred refinement.

Figure 3:
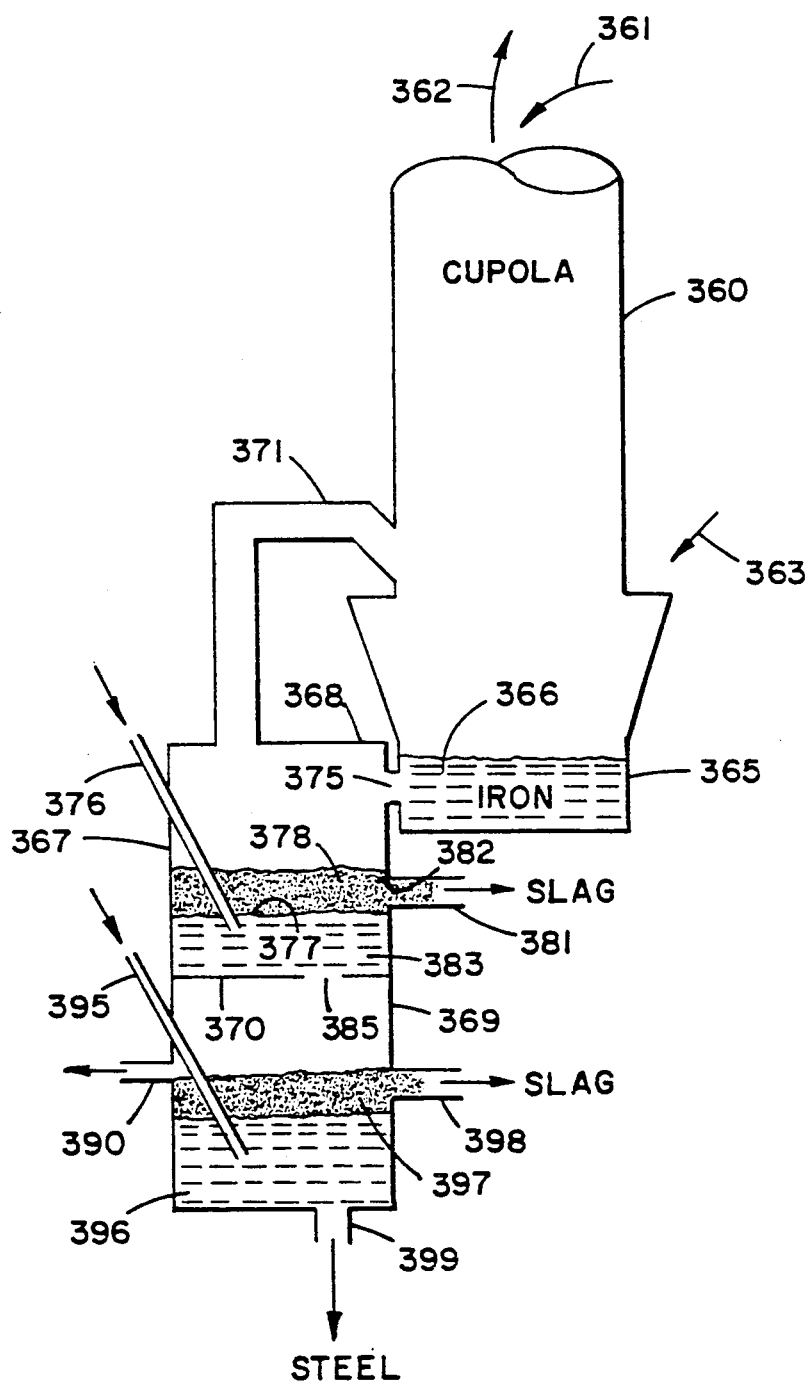
FIG. 3 is a schematic representation of a portion of a plant system according to an embodiment of the present invention, wherein molten metal drawn off of the cupola is refined to steel.

Referring to FIG. 3, a cupola 360 specifically adapted for use in generating steel is illustrated. For the embodiment illustrated in FIG. 3, pellet introduction into the cupola 360 is generally indicated at line 361, and off gas escape is generally indicated at line 362. Air or oxygen introduction into the cupola 360 is generally indicated at line 363. In a bottom area or section 365 of the cupola 360, during operation, reduced iron 366 will collect. It is foreseen that this iron 366 can be selectively tapped, under cupola operating pressures, into a multi-chamber refining unit or arrangement 367 having an upper (first) chamber 368 and a lower (second) chamber 369, separated by interface 370. The upper chamber 368 is vented to the cupola 360 via line 371.

During a typical operation, iron will be tapped from the cupola furnace with approximately the composition shown in Table 1 below, under the heading "Cupola Discharge". Such a metal has undesirable quantities of carbon, sulfur, phosphorous, oxygen, and other elements therein. The metal will be tapped under pressure, i.e. the operating pressure of the cupola 360, i.e. through flow/gate means 375, and into upper chamber 368. The gate 375 may include conventional means (not shown) for selective opening and closing.

In general, the chambers 368 and 369 preferably include means for selective introduction of gases and minerals thereto. In the upper chamber, calcium oxide (lime) can be added to remove sulfur and phosphorous with the slag that forms. These materials can be introduced via line 376, below the upper surface 377 of molten material in chamber 368. The line 376 will typically be used to deliver a gas stream of argon, nitrogen or other gas, typically at a rate of about 50 kilograms per ton of steel. Oxygen will also typically be blown into the chamber, preferably also under the surface of molten metal. Such oxygen will react with the carbon present, to form carbon monoxide, which can be exhausted as a gas into the cupola of 360, via line 371. It is anticipated that for typical operations, the composition of the molten metal leaving the upper chamber will generally be as shown in Table 1 under the column headed "Upper Chamber Discharge". Slag 378, on the surface of steel forming in the upper chamber 368, could be selectively removed by means such as shown via line 381, through gate 382.

Gate or gate arrangement 385, in the bottom of upper chamber 368, can be used to selectively discharge the steel 383 into the lower chamber 369. After gate 385 is reclosed, the pressure in the lower chamber 369 can be reduced to nearly atmospheric pressure, by venting the chamber 369 via line 390. The hot off gases through line 390 can be directed elsewhere in the overall process, for example at the steam generating furnace.

The reduced pressure in lower chamber 369 aids gas release from the liquid steel. Also, aluminum can be injected into the lower chamber 369 via line 395, preferably with strong mixing. In typical procedures, aluminum will be injected at a rate of about 20-60 kilograms per ton of steel. The aluminum can react with oxygen to form aluminum oxide, which will combine with the slag. Generally argon would also be fed via line 395, to bubble through the steel 396 and remove nitrogen and hydrogen. A typical rate of injection of argon would be approximately 50 liters per minute per ton of steel. An added benefit of bubbling the argon through the steel is to bring inclusions to the surface, where they coagulate with the slag 397. Such inclusions typically include oxides, sulfides, oxysulfides, nitrites and carbides of aluminum, iron, silicon and other elements. The bulk of the material in the slag 397 comprises FeO, MnO, and SiO. These materials can be removed readily via means such as line 398, as slag, with the final steel product being removed via bottom port 399, selectively.

The approximate composition of liquid steel after the aluminum argon injection procedure is illustrated in Table 1 below, under the heading "Aluminum and Argon Injection".

Subsequent to aluminum and argon injections, the lower chamber will typically be operated under a partial vacuum to remove additional gases. Calcium oxide—calcium fluoride may be added to remove additional sulfur at this stage, when the oxygen potential has been reduced to lower levels. About one to three kilograms of CaO—CaF$_2$ would typically be added per ton of steel (90% CaO, 10% CaF$_2$). In a batch process this can be done in a period of about three to five minutes. This material will tend to modify the remaining inclusions to a calcium aluminate form, which has a spherical shape preferred for steel products.

In Table 1 below, the composition of the final product removed via port 397, after the calcium oxide—calcium fluoride treatment is indicated under the heading "Clean Steel". It is anticipated that under various conditions an even cleaner product than that suggested by Table 1 can be obtained.

TABLE I

|  | Cupola Discharge | Upper Chamber Discharge | Aluminum and Argon Injection | Clean Steel (less than) |
|---|---|---|---|---|
| Fe | 95.42% | | | |
| C | 3.0% | | 0.1% | 0.04% |
| S | 0.03% | 0.02% | | 0.015% |
| P | 0.006% | | | 0.015% |
| N | | 70 ppm | 30 ppm | 15-40 ppm |
| O (dissolved) | | 150 ppm | 60 ppm | 6 ppm |
| O (total) | | | | 17-35 ppm |
| H | | | 5 ppm | 2 ppm |
| Cu | 0.01% | | | |
| Ti | 0.01% | | | |
| Mn | 0.08% | | | 0.40% |
| Cr | 0.02% | | | |
| Ni | 0.02% | | 0.03% | 0.02% |
| Si | 1.45% | | | |

An alternate arrangement is illustrated by FIGS. 4 and 5. This arrangement is adapted for operation on a substantially continuous flow of material from the cupola. For the arrangement shown in FIG. 4, molten iron is continuously tapped from the cupola, via line 400, into chamber arrangement 401. As the stream of molten metal flows through first chamber 402 toward laterally spaced second chamber 403, lime (i.e. mineral material) and oxygen can be injected into the bottom channel via means such as line 404. Slag can continuously be removed from an upper surface 405 of the molten iron via means such as tap 410.

The molten iron would then be allowed to flow through port 415 into the second chamber 403. In this chamber aluminum (mineral) and argon (gaseous material) can readily be injected via means such as line 420. In general, it is foreseen that the second chamber 403 can be maintained under reduced pressure (partial vacuum), to facilitate processes therein. Calcium compounds can also be injected with additional inert gas in the second chamber via line 421. The result of the aluminum, argon, calcium oxide, calcium fluoride insertion is generation of steel, as previously described. Slag 425, floating on top of the steel product 426, can be removed via means such as slag tap 427 and, at the end of the process, steel can be readily removed via port 428. In the schematic of FIG. 4, additional argon lines 430 are illustrated, for chamber 403; and, additional oxygen line 431 is illustrated for chamber 401. Off gases can be readily removed from the system via lines 435 and 436. These off gases can be directed elsewhere in the process, for example to the steam generation plant for efficient use. At 440, heating coils are indicated. Aperture 441 in projection 442, allows for passage of slag. The projection 442 itself generates some mixing in the first chamber 402, to facilitate refining. In FIG. 5, a cross-section illustrating a trough-like configuration to arrangement 401 is shown.

It will be understood that while the multi-chamber refining units shown in FIGS. 3 and 4 include two chambers each, arrangements including more than 2 chambers may be provided, in accordance with many of the principles of this invention.

Advantageous Arrangement of Conducting Stage 2 Under Pressure

In an advantageous arrangement, iron reduction and/or melting is done under pressures greater than atmospheric pressure. The pressure of the off gases represents substantial energy. This energy may be extracted to drive a high pressure gas turbine in Stage Three, thereby facilitating more efficient energy production. In an advantageous arrangement, reduction is effected under substantial pressure for enhanced reduction and to obtain the benefit of pressurized output gases. The arrangement also decreases the pressure of the molten metal, overcoming the handling problems in a manner as described below.

Figure 6:
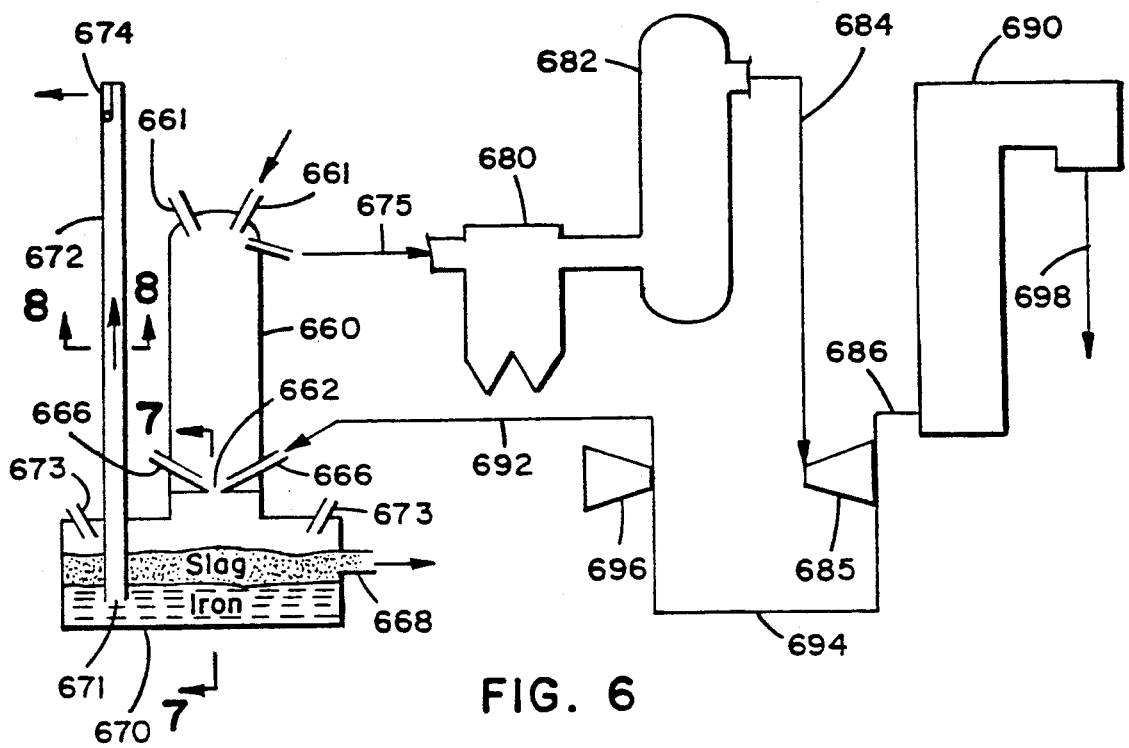
FIG. 6 is schematic representation of an embodiment of an iron reduction process under pressure according to the present invention.

As shown in FIG. 6, feed stock is input to a pressurized cupola 660 through lines 661. Operating pressures are at least 50 psia (345 kPa) and in some applications preferably range from 250-300 psia (1,720-2,070 kPa), depending on the characteristics of the feed stock, temperature, and flow rate. The feed stock melts before flowing out tap hole 662 at a lower end of cupola 660. Air for reduction is fed from a compressor 696 through line 692 and is forced into the cupola 660 through tuyeres 666 above tap hole 662. The melted iron material then collects in a pool in a lower chamber 670 while still under pressure. The iron material may be further refined in lower chamber 670. Gases and/or minerals are introduced at inlets 673 to facilitate refinement. Slag forming on the surface is drawn off of the molten metal and disposed out line 668.

The remaining iron material passes up an inlet 671 of a vertical tap arrangement 672 comprising a conduit extending down into the molten iron so that the inlet 671 is submerged below the surface of the molten metal. The high pressure of the cupola 660, and the weight of materials from the cupola 660, forces the molten iron up the vertical tap arrangement 672. Although the pressure forces the molten metal up vertical tap arrangement 672, the metal's weight counteracts the gas pressure. Thus, as the molten metal rises, the head pressure decreases. At an advantageous height, the weight of the metal has offset the head pressure, so that the molten metal may be tapped and relatively safely handled, thereby overcoming the problems associated with handling pressurized molten metal. For a cupola operating at 250-300 psia (1,720-2,070 kPa), an outlet 674 will be at a height approximately 50 feet (15.25 m) above the level of the molten iron in the cupola lower chamber 670. In general, the vertical tap arrangement 672 performs the same function at any pressure greater than atmospheric pressure. Varying height of the tap arrangement 672 adapts the arrangement to other pressures, but the tap arrangement of 672 need not be adjustable if operated at a constant pressure. In one embodiment the outlet 674 is vertically adjustable for operation over a range of pressures, but other methods of varying height, such as removable conduit sections, may be used.

Figure 8:
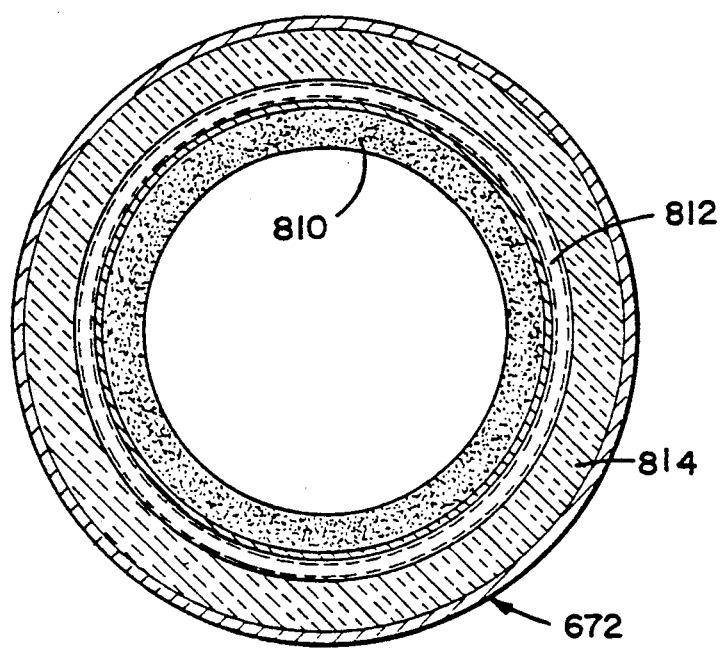
FIG. 8 is a sectional view of the vertical tap arrangement according to the present invention, taken at line 8—8 of FIG. 6.

In a preferred embodiment, the vertical tap arrangement 672 as shown in FIG. 8 has a refractory lining 810. The refractory 810 is advantageously encompassed by intermittently spaced heating coils 812 or other heating means. The tap arrangement 672 preferably includes an insulation layer 814, to maintain a temperature over about 2,500° F. (1,370° C.) and prevent freezing of the molten metal. Upon reaching the top outlet 674 of the vertical tap arrangement 672, the molten iron is at approximately atmospheric pressure, and may be further refined, for example in manners analogous to those described with respect to FIGS. 3, 4 and 5.

Figure 7:
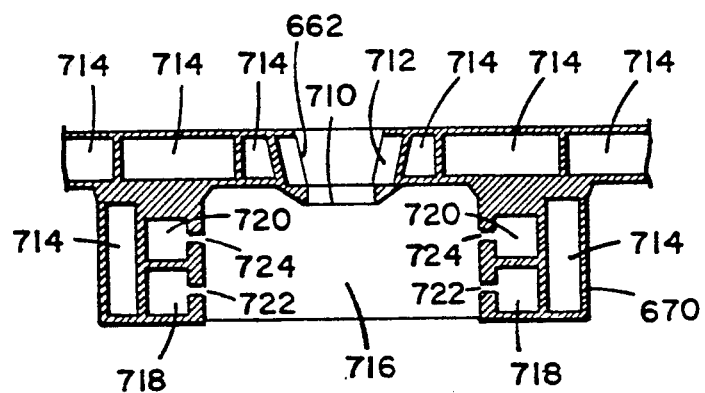
FIG. 7 is a sectional view of a bottom portion of a pressurized cupola of an advantageous arrangement according to the present invention taken at line 7—7 in FIG. 6.

FIG. 7 shows a cross-sectional view of the lower portion 670 of the cupola 660 of FIG. 6. A lower ring 710 of the tap hole 662 is surrounded by cooling water in chambers 714. The molten iron passes through the lower ring 710 into a lower chamber 716. Oxygen from chamber 718 and methane from chamber 720 surrounding the lower chamber 716 pass through lines 722 and 724 respectively to aid in the refinement process. From the lower chamber 716, the iron may pass into the various other chambers for further refinement.

Referring again to FIG. 6, output gases under pressure greater than atmospheric pressure from cupola 660 leave through line 675 to a filter 680 and sulfur removal chamber 682. The clean gas is then directed to a high pressure gas turbine 685 to produce electricity. The gas may then pass through a second turbine stage (not shown) and/or is further utilized in a boiler 690 to produce steam for further electricity production. The turbine 685 may also be used to drive compressor 696 for feeding pressurized gas to cupola 660. Flue gas generated in the boiler 690 passes out of the boiler 690 at 698.

EXAMPLE 1

The following provides a description of operation of a typical processing plant, on a scale which would generally be useful, according to the present invention. It will be understood that a variety of plant sizes, and operating conditions, may be utilized according to the principles described previously. For the example illustrated, it is envisioned that coal feed into the system will be on the order of about 79 tons per hour. From the extraction and pyrolysis, for a typical coal feed, about 31 tons per hour of oils and 21 tons per hour of volatile gases, can be released, resulting in formation of about 27 tons of char per hour.

Pelletization depends upon the nature of the iron to be reduced. If iron ore such as taconite is involved, about 13 tons per hour of the 27 tons per hour of the char should be hardened into pellets without the taconite, for example via steam induration as previously described, with sufficient water and lime being provided to facilitate pellet integrity. About 14 tons per hour of the char should be mixed with about 70 tons per hour of the iron ore, 4.5 tons per hour of lime, and 11.5 tons per hour of water, to form about 100 tons per hour of pellets. Typically, along with the steam induration process, a drying step may be utilized to drive moisture out of the pellets, resulting in about 90 tons per hour of ore-containing pellets being fed into the cupola, with the cupola also being fed with the 13 tons per hour of char which was pelletized without ore.

As previously indicated, the cupola can be operated under a variety of conditions. For a typical run, about 116 tons per hour of combustion air should be driven into the cupola, to form about 161 tons per hour of off gases, 18 tons per hour slag, and 40 tons per hour of reduced iron, i.e. pig iron, which can be readily converted to steel, as previously described.

The gases in the cupola are rapidly cooling, as they pass through the material in the cupola. However, these gases are reheated during the burning process, to a relatively high temperature. This permits efficient energy generation via the gas turbine, and the follow-up boiler/steam system. Generally, conventional equipment can be utilized to accomplish this.

Alternate Embodiment Involving no Autoclave Operation for Pelletization

As previously described, if it is necessary, prior to introduction into the cupola or reactor, that the pellets of coal char be hardened, typically an autoclave treatment will be required, as for example is represented at reference numeral 52, FIG. 1. For example, if the reactor or cupola 60 were being operated at about atmospheric pressure or other relatively low pressures, and with a substantial through-flow of gases, a heat and pressure hardened pellet would be needed, in order to maintain structural integrity to the char material in the reactor, and avoid having the char blown outwardly therefrom by the gases.

Also as previously explained, systems involving an autoclave pretreatment of the pellets prior to the introduction into the reactor are generally less desirable since autoclaves are generally better suited to operation as part of a batch process, rather than a continuous process. This, again, would generally necessitate a need for a number of autoclaves, in order to ensure high productivity of materials in the furnace. Also, substantial costs would be associated with the construction and operation of the autoclaves, and valuable space would be taken up by the plurality of autoclaves.

In some embodiments it is possible to utilize the pellets 50, FIG. 1, in the cupola or reactor 60, without any pretreatment in the autoclave 52. This optional operation is generally represented at dotted line 800, FIG. 1, whereby the pellets 50 are shown charged directly into the reactor 60, without passage through autoclave 52 for treatment. In line 800, an optional dryer 801 is shown, which may be used to simply dry excess water out of the pellets 50, if desired.

The circumstances in which the pellets 50 can be charged into reactor 60 without a prior passage through an autoclave 52, are generally met if the processes in the reactor 60 are conducted under sufficient pressure. If this is the case, then the pellets 50 would tend to be heat and pressure hardened in upper portions of the reactor 60, as they are continuously fed thereto. Thus, before they would pass significantly downwardly through the reactor 60, they would be sufficiently hardened, due to the high pressures and temperatures, to retain their structural integrity during a reactor operation. In general, if the pressures within the reactor 60 are maintained at about 100–400 psia (690–2,760 kPa), and preferably about 250–300 psia (1,720–2,070 kPa), sufficient pressures will be involved to obtain efficient use of the pellets 50, without a pretreatment in an autoclave.

In a typical operation, the green pellets 50 are injected into the top of the reactor 60 without any preconditioning, except if desired by drying in oven 801. The pellets 50 are then involved in the reduction or melting of metal in the lower portions of the vessel or reactor, with the metal exiting the bottom as molten metal, and with slag being drawn off through the appropriate tap, as previously described. Since the process is generally a continuous one, rather than a batch process, some of the inherent inefficiencies to the use of autoclaves are avoided to advantage. Also, the overall time involved in the treatment of the pellets is reduced, since the conditions of the reactor 60 are generally extreme relative to those in a typical autoclave 52. Finally, equipment for the loading and unloading of autoclaves, such as surge capacity bins and/or equipment for dust collection, is avoided to advantage.

In a typical operation of a reactor 60, with green pellets 50, i.e. pellets not treated in an autoclave 52, a continuous process involving a total residence time of the pellets within the reactor 60 of on the order of 60–110 minutes can be obtained. It is noted that some relative thermal efficiencies result, since there would be no cooling of the pellets 50 as might occur between an autoclave treatment and a smelting process. That is, the pellets 50 need not be heated up twice.

Embodiments Involving a Preferred Handling of the Slag from the Reactor

As explained above, one of the major products of the metal reduction and melting process conducted in the reactor cupola, is slag. In many conventional smelting processes, the slag represents a waste material which must be cooled and disposed of in a suitable manner. In preferred embodiments of the present invention, the slag is processed into a commercially useful material, and the heat content of the slag is used to facilitate the overall process. Schematic diagrams illustrating systems in which this is accomplished, are shown in FIGS. 9, 10, 11, 12 and 13.

It will be understood that in the practice of the overall system described, a major purpose of the plant is the production of energy, such as electrical energy. On a large and continuous scale, the coal demands of this could involve a large amount of iron refining and slag formation. Unless a commercially viable use for the slag is incorporated into the system, some inefficiencies from waste handling could result.

FIGS. 9 and 10 represent a first embodiment for a viable processing of the slag. Referring to FIG. 9, a reactor or cupola 900 is depicted, receiving pelletized material via upper port 901 and along path 902. Reactor 900 may be generally analogous to reactor 60, previously described.

Reactor 900 includes, in a lower portion thereof, port 903 which may be used to introduce gases or various reactants into the reactor 900. It will be understood that a plurality of ports 903 may be used, and following the process conducted in reactor 900 molten metal and slag will drain out of the upper portion of the reactor 900 through bottom port 905, along path 906. In FIG. 9, the molten metal and slag are shown received within lower chamber 910. In general, the molten metal is represented at 911, with a layer 912 of slag thereon.

It is foreseen that during typical operations, the processes within the reactor 900 will be conducted at pressures of at least 50 psia (345 kPa), and preferably 100-400 psia (690-2,760 kPa). In most instances, it is foreseen that the processes will be conducted at about 250 to 300 psia (1,720-2,070 kPa), at temperatures on the order of 2,700° F. (1,480° C.).

Raising the temperature of the reactor 900 leads to a more efficient process. As the temperature increases, the pelletized material becomes molten faster, thereby increasing the rate of flow through the reactor 900. For example, plasma torches may replace the ports 903 for increasing the temperature in the reactor up to about 4,000° F. (2,220° C.). Alternatively, as shown in FIG. 13, coal fines or char indicated by arrow 995 may be input with hot air indicated at arrow 996 to reactor 900 so the ports 903 function as burners 994 to raise the temperature of reactor 900. For increased efficiency, the hot air 996 may be recovered from succeeding operations as further explained hereinafter.

The system depicted in FIG. 9, includes means such as previously described, for removal of molten metal from the pressurized system. In particular, attention is directed to the description of tower 672 FIG. 6. Analogously, the system shown in FIG. 9 includes a vertical tap arrangement 917, with a bottom port 918 for receipt of the molten material (metal). The molten material will fill up the internal chamber 919 of the tower 917, in response to the pressure within the reactor 900. As a result, and as described with respect to FIG. 6, the metal can be readily drawn off from the pressurized system.

In FIG. 9, hot slag material is shown drawn from chamber 910 through tap 922. Tap 922, it will be understood, includes an upper lip 921 of sufficient extension to project above the metal 911, and thus would substantially only receive slag 912 therethrough. Via tap 922, the hot slag material is directed into a slag holding furnace 923.

As previously indicated, the system of FIG. 9 is intended for the derivation of value from the slag material 912 developed in the reactor process 900. According to the process, the slag material 912 is converted to a mineral fiber material, for later use. The heat value of the slag material is in part utilized, for example to heat process gases for the reactor 900. This will be further understood from the following details.

It is foreseen that the slag material in the slag holding furnace 923 will typically be at about 2,500°-2,700° F. (1,370°-1,480° C.), the temperature at which the slag material is quite flowable. The slag holding furnace 923 may be provided with means such as heating coils, not shown, to maintain the slag material in a flowable state. An oxidizing stream may be introduced at port 932 to the holding furnace 923. Oxygen or other gases introduced to the holding furnace 923 react with calcium-sulfur compounds in the slag 925 to form compounds easier to handle. A level 924 of flowable slag material 925 is depicted within the slag holding furnace 923. It will be understood that fluxing agents may be added to the slag material in the holding furnace 923, if desired.

The slag holding furnace 923 is provided with a bottom exit port 926 for the flowable slag 925. It will be understood that for the system represented, the depth of the material 925 in furnace 923 must be sufficient to overcome the height of lip 927, on the bottom exit 926. The elongate furnace 923 is preferably mounted to pivot about a transverse, horizontal axis, so that a depth of the molten material 925 in the portion of the furnace 923 in the vicinity of lip 927, can be adjusted by means of jack system 928 on an opposite end of elongate furnace 923. Thus, jack system 928 can be used, in part, to control or adjust the rate of flow of slag material 925, through bottom exit 926.

The bottom exit 926 is used to feed slag material 925 into a mineral wool furnace 929, through conduit 930. Conduit 931 is provided, to allow for the addition of mineral additives such as fluxing agents, if desired, to the material pouring into mineral wool furnace 929. A purpose of mineral wool furnace 929, is to obtain a proper composition in the slag material 925, and temperature of the slag material 925, to provide for a selected and desired formation of mineral wool therefrom.

The manufacture of mineral wool from material such as molten slag, is known, see for example Humphreys, Kenneth K. et al, "Coal Ash Usage; Producing Mineral Wool from By-Products", MINERALS PROCESSING March 1970, pages 16-21; Manz, Oscar E., "Utilization of By-Products from Western Coal Combustion in the Manufacture of Mineral Wool", report by the North Dakota Mining and Mineral Resources Research Institute, pages 550-559; and Manz, Oscar E. "Utilization of By-Products from Western Coal Combustion in the Manufacture of Mineral Wool and Other Ceramic Materials", CEMENT AND CONCRETE RESEARCH, Volume 14, pages 513-520, 1984; all of which are incorporated herein by reference. Attention is also drawn to U.S. Pat. Nos. 4,526,597 (glass fiber formation); 4,601,742 (blower for fiber formation); and 4,650,510 (slag holding furnace shown), all of which are incorporated herein by reference, and which generally concern formation of fiber materials.

According to the present invention, fiber products are made from the slag, for example by similar or analogous methods (i.e. by spinning and/or blowing). For the arrangement depicted, molten slag material from 929 is directed, via conduit 940, onto a spinning disk fiber forming arrangement (i.e. spinning) 941. The spinning disk arrangement 941 will, in operation, spin to cause the molten slag material being deposited thereon, to be thrown or blown off in the form of fibers. The fibers may be drawn out, by the passage of a stream of compressed air past the arrangement 941. A variety of methods may be utilized to accomplish the spinning and/or blowing.

The spinning and fiber forming is conducted within an arrangement 943 having an internal chamber 944 with a rotating drum arrangement 945 mounted therein. The drum arrangement 945 includes means for rotation around axle 946. Typically, the drum arrangement 945 will include a perforated outer periphery, and the fibers formed by disk 941, and drawn out therefrom, are blown onto the drum 945. An air compressor 950 is used to direct a blast of air, via path 951, across the spinner arrangement 941 to draw out the fibers and carry them to the drum 945. The air passes through the perforated portions of the drum 945, to an internal portion 952 thereof, and is vented outwardly from the system via conduit 953, as indicated by arrows 954. The mineral wool fibers are carried, by the rotating motion of the drum 945, outwardly from the system along the path indicated at arrow 955 to a conveying and packing arrangement 956. The arrangement 956 depicted, comprises compression rollers 957. The rollers 957 may be used to both convey the fiber material formed on the drum 945 outwardly from the system, and also to compress the fiber material. The arrangement 956 is shown directing the fiber material into a packing chamber 959. By means of ram 958, the material can be packed into a dense block or brick form if desired, for removal via port 960.

It will be understood that as the air from compressor 950 passes through the system, and especially across spinner arrangement 941 and drum 945, a great deal of heat can be transferred to the air, from the cooling slag material. It is anticipated that cooling of the slag material will be facilitated by this, and the heat transferred therefrom to the air can be utilized within the overall system. In particular, for the preferred system shown, the hot air, which will be at about 900°–1,200° F. (480°–650° C.) for typical operations, is shown passing along path 954 to be directed, as shown at 961, into the reactor or cupola 900. An optional booster is indicated at 965 for heating the air if desired. Further, an optional preheater is indicated at 966, for optionally heating the air from compressor 950, if desired, before it encounters the molten material at spinner 941. Of course path 954 can be directed to points in the system other than the cupola 900, for efficient use of the heat value. If the temperature is raised to 1,500°–1,800° F. (815°–980° C.), larger heat values may be drawn off for use in the reactor 900 where high temperatures are required. With the higher temperature, the slag requires longer cooler times, which produce longer fibers in the mineral wool to advantage.

In FIG. 10, a cross-sectional view of a portion of FIG. 9 is shown. In particular, the region of the drum 945 is shown. The drum 945 is illustrated rotatable in the general direction of arrows 964. As the fibers are spun or blown onto the drum 945, the rotating motion of the drum 945 forces the fibers generally along path 962 toward compression rollers 957. Port 963 is depicted for the application of binder material, or the like, to the wool fiber moving along path 962. The binder materials can be used to help retain the wool fibers in compressed bundles. In FIG. 10, conveyor rollers 967 are shown facilitating movement of fibers through the system. Also, in FIG. 10, air flow to and through the drum 945, and outwardly through conduit 953, is indicated by arrows 968.

As suggested above, for the system shown in FIGS. 9 and 10, the mineral fibers will be compressed and allowed to harden as block or brick material in chamber 959, for removal therefrom with assistance by the ram 958. It is foreseen that depending on the final use of the mineral fibers, they can be coated with the surface coating of cement or the like.

For certain high-pressure operations of the system, it is foreseen that if the bricks in chamber 959 have a particularly large cross-section, the substantial pressures involved could cause inconvenience and operation limitations. An alternate method of handling the mineral wool fibers, to lessen such problems, is illustrated in FIGS. 11 and 12.

Referring to FIG. 11, a fragmentary schematic is shown involving the mineral wool production, and air heating section, of a system analogous to that shown in FIG. 9. In particular, an analogous mineral wool furnace 976, spinner system 977, rotating drum 978, hot air removal conduit 979, optional booster 980, air compressor 981 and optional preheater 982 are shown. It will be understood that, in general, the fibers formed at spinner 977 are blown onto drum 978 and rotated therearound to follow the path generally indicated at arrow 983. Air from compressor 981 passes across spinner 977 into perforated drum 978 and outwardly through conduit 979 and, eventually, may be returned to the cupula or reactor vessel along the general path indicated at arrow 985.

The basic difference between the arrangement shown in FIGS. 11 and 12, and the system of FIGS. 9 and 10, is the manner in which the mineral wool fibers are handled after they have been formed and have been passed beyond the rotating drum. In particular, for the system shown in FIGS. 11 and 12, the fibers are passed into a compression and twisting system 987, which compresses the fibers and twists them into a rope 988. The rope 988 can then exit the system through port 989. In general, system 987 operates through a twisting motion applied to the fibers by means of pairs of rollers, such as indicated by rollers 990. It is foreseen that a rope 988 of mineral fiber material may be readily removed from even a highly pressurized system.

A pressure seal within the system can be maintained in any of a variety of manners. Referring to FIG. 12, port 992 is shown for dispensing fluid, such as water, into region 991. The flood 991, overflowing exit port 989, will tend to cause a gas seal around the rope 988 exiting through port 989. This can be used to maintain appropriate pressure within the system. It is foreseen that the mineral rope 988 could be configured for a variety of commercial uses, including as insulating material.

From the above-descriptions relating to FIGS. 9, 10, 11, and 12, it will be understood that according to a preferred embodiment of the present invention, slag formed in the reactor, from use of the pellets, is used in a preferred manner, to limit waste. In particular, the slag material is converted to a mineral fiber, and the heat content of the slag from the furnace is at least in part utilized. In the preferred system described, the heat content is specifically utilized to heat air driven into the reactor itself. It will be understood that a variety of other uses may be made to this heated air; for example, it can be utilized in other portions of the system; for example, through use of appropriate heat exchange arrangements.

It is foreseen that the mineral wool formed may be used in a variety of manners, including in ground, loose or tightly packed states. In particular, for example, the material may be used as insulation, packing for mufflers, as filler in cements or the like, as sound proofing board, and in tile. Also, the fibers may be attached to paper or fabric, and used as an insulating wrap.

It is to be understood that while certain embodiments of the present invention have been illustrated and described, the invention is not to be limited to the specific arrangements described herein, except as provided for by the following claims.

What is claimed and desired to be secured by Letters Patented is as follows:

1. A process for the production of electricity with relatively efficient use of fuel material; said process including the steps of:
   (a) providing a low grade coal fuel;
   (b) performing a liquefaction procedure on said coal fuel to remove oil and volatiles therefrom, and to generate a resultant coal char product;
   (c) pelletizing the coal char product to form coal char product pellets, said step of pelletizing comprising pelletizing at least a portion of the coal char product in combination with reducible solid iron material to form coal char product pellets containing reducible solid iron material;

(d) charging a cupola with the coal char product and the reducible iron material, said step of charging a cupola being characterized by charging substantially all the coal char product in the form of the coal char product pellets and substantially all the reducible solid iron material in the form of pellets containing the coal char product in combination with the reducible solid iron material;

(e) reducing and melting substantially all the reducible solid iron material in the coal char product pellets by heating the pellets in the cupola at a suitable temperature in the presence of a sufficient upward flow of process gases, with the resultant formation of reduced molten iron material, hot slag material, and hot product gases;

(f) forming a mineral wool fiber material from the hot slag material;

(g) tapping the hot product gases from an upper portion of the cupola;

(h) directing the hot product gases downstream to electrical production equipment; and, (i) producing electricity from the hot product gases.

2. The process according to claim 1 wherein:
(a) said step of liquefaction comprises an extraction of said coal fuel with a solvent, followed by a pyrolysis.

3. The process according to claim 2 wherein:
(a) said solvent is selected from the group comprising water and organic phenols; and
(b) said pyrolysis comprises treatment of extracted coal fuel at a temperature of at least about 600° C. to drive volatiles therefrom.

4. The process according to claim 1 wherein:
(a) said step of heating comprises heating in a cupola to at least 1,370° C.

5. The process according to claim 4 wherein:
(a) said step of heating in a cupola comprises heating under a pressure of at least 345 kPa.

6. The process according to claim 5 wherein:
(a) said pelletizing includes mixing with said char product and said iron material, a binder selected from the group consisting of silica, burned lime, water and mixtures thereof.

7. The process according to claim 1 wherein:
(a) said step of producing electricity from said product gases includes passing said product gases through a gas turbine to generate electrical power and then through a boiler to generate steam; at least a portion of said steam being utilized to drive a turbine and generate electrical power.

8. The process according to claim 7 wherein:
(a) said step of liquefaction includes an extraction of said coal fuel with a hot solvent, followed by a pyrolysis; and,
(b) energy to heat said hot solvent and drive said pyrolysis is at least partially supplied by said steam generated in said boiler from said product gases.

9. The process according to claim 5, wherein said pressure is 1,720–2,070 kPa.

10. The process according to claim 5, including a step of lowering head pressure of reduced molten iron material to near atmospheric pressure.

11. The process according to claim 10 wherein said step of lowering molten iron head pressure comprises the step of using gas pressure within the cupola to force said iron material up a vertical tap arrangement, so that the molten iron head pressure decreases as said iron material rises.

12. The process according to claim 11 wherein said head pressure lowering step further includes heating said vertical tap arrangement to maintain said iron material in a flowable state.

13. A process according to claim 1, wherein said coal char product from step (b) is used as activated carbon and, following said use, said char is utilized in step (c) pelletizing.

14. The process according to claim 1 wherein:
(a) said hot slag material is used to heat compressed air during said step of forming a mineral wool fiber material: and,
(b) said air heated from step 20(a) is utilized in said step of reducing and melting the reducible solid iron material.

15. A process for the production of electricity with relatively efficient use of fuel material; said process including the steps of:
(a) providing a low grade coal fuel;
(b) performing a liquefaction procedure on said coal fuel to remove oil and volatiles therefrom, and to generate a resultant coal char product;
(c) pelletizing the coal char product to form coal char product pellets, said step of pelletizing comprising pelletizing at least a portion of the coal char product in combination with reducible solid iron material to form coal char product pellets containing reducible solid iron material;
(d) charging a cupola with the coal char product and the reducible solid iron material; said step of charging a cupola being characterized by charging substantially all the coal char product in the form of coal char product pellets and substantially all the reducible solid iron material in the form of pellets containing the coal char product in combination with the reducible solid iron material;
(e) reducing and melting substantially all the reducible solid iron material in the coal char product pellets by heating the pellets in the cupola at a suitable temperature under a pressure of greater than 345 kPa in the presence of a sufficient upward flow of process gases, with the resultant formation of reduced molten iron material, hot slag material, and hot product gases having pressures greater than atmospheric pressure;
(f) forming a mineral wool fiber material from the hot slag material;
(g) tapping the hot product gases from an upper portion of the cupola;
(h) directing the hot product gases downstream to electrical production equipment;
(i) producing electricity from the hot product gases having pressures greater than atmospheric pressure; and,
(j) lowering a head pressure of reduced molten iron material from step (e) to near atmospheric pressure for safer and easier control of said molten iron material.

16. The process according to claim 15, wherein said step of lowering molten iron head pressure comprises the step of using gas pressure to force said iron material up a vertical tap arrangement so that said head pressure decreases as said iron material rises, thereby lowering said head pressure upon rising to a top outlet of said vertical tap arrangement.

17. The process according to claim 16 wherein said head pressure lowering step further includes heating said vertical tap arrangement to maintain said iron material in a free flowing state.

18. The process according to claim 15 wherein the coal char product from step (b) is used as activated carbon in water treatment; and, following said use, the char is utilized in step (c).

19. The process according to claim 15 further including utilizing heat derived from the high pressure hot product gases in the performance of steps (b) and (e) to achieve a thermally efficient process.

20. The process according to claim 15 wherein said step of reducing and melting the iron is conducted at a temperature of at least about 4,000° F. (2,200° C.).

* * * * *